United States Patent
Deng et al.

(10) Patent No.: US 10,826,769 B2
(45) Date of Patent: Nov. 3, 2020

(54) DATA PROCESSING METHOD AND DEVICE

(71) Applicant: HUAWEI TECHNOLOGIES CO., LTD., Shenzhen, Guangdong (CN)

(72) Inventors: Qiang Deng, Shenzhen (CN); Wanqiang Zhang, Munich (DE); Zhenglei Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/899,861

(22) Filed: Feb. 20, 2018

(65) Prior Publication Data
US 2018/0176927 A1    Jun. 21, 2018

Related U.S. Application Data

(63) Continuation of application No. PCT/CN2015/087606, filed on Aug. 20, 2015.

(51) Int. Cl.
*H04W 72/08* (2009.01)
*H04W 72/00* (2009.01)
(Continued)

(52) U.S. Cl.
CPC ......... *H04L 41/0893* (2013.01); *H04B 17/40* (2015.01); *H04W 4/023* (2013.01);
(Continued)

(58) Field of Classification Search
CPC ..... B41N 3/006; H04B 17/40; H04L 41/0893; H04W 12/08; H04W 4/023; H04W 4/06;
(Continued)

(56) References Cited

U.S. PATENT DOCUMENTS

2008/0212583 A1    9/2008  Rey et al.
2014/0286222 A1*   9/2014  Yu ........................ H04W 4/08
                                                    370/312
(Continued)

FOREIGN PATENT DOCUMENTS

CN    104469695 A    3/2015
JP    2018-520588 A  7/2018
(Continued)

OTHER PUBLICATIONS

"3$^{rd}$ Generation Partnership Project; Technical Specification Group Services and System Aspects; Study on extended architecture support for proximity-based services (Release 13)," 3GPP TR 23.713, V1.0.0, Feb. 2015, 59 pgs.
(Continued)

*Primary Examiner* — Awet Haile
(74) *Attorney, Agent, or Firm* — Leydig, Voit & Mayer, Ltd.

(57) ABSTRACT

Embodiments provide a data processing method and device. A PCRF entity obtains subscription information of remote UE, and determines a QoS rule of relay UE according to the subscription information and service QoS of the remote UE, and the PCRF entity sends the QoS rule of the relay UE to a PGW, where the QoS rule is used by the PGW to modify or establish a bearer of the relay UE, and the bearer of the relay UE is used by the relay UE to forward data of the remote UE, thereby ensuring the service QoS of the remote UE.

14 Claims, 9 Drawing Sheets

(51) Int. Cl.
*H04W 76/14* (2018.01)
*H04W 76/40* (2018.01)
*H04B 17/40* (2015.01)
*H04L 12/24* (2006.01)
*H04W 4/02* (2018.01)
*H04W 88/04* (2009.01)
*H04W 12/08* (2009.01)
*H04W 76/20* (2018.01)
*H04W 4/06* (2009.01)

(52) U.S. Cl.
CPC ....... *H04W 72/005* (2013.01); *H04W 72/085* (2013.01); *H04W 4/06* (2013.01); *H04W 12/08* (2013.01); *H04W 76/14* (2018.02); *H04W 76/20* (2018.02); *H04W 76/40* (2018.02); *H04W 88/04* (2013.01)

(58) Field of Classification Search
CPC . H04W 72/005; H04W 72/085; H04W 76/14; H04W 76/20; H04W 76/40; H04W 88/04
See application file for complete search history.

(56) References Cited

U.S. PATENT DOCUMENTS

| | | | |
|---|---|---|---|
| 2014/0313974 A1 | 10/2014 | Chandramouli et al. | |
| 2015/0029866 A1 | 1/2015 | Liao et al. | |
| 2016/0197927 A1 | 7/2016 | Ma et al. | |
| 2016/0381491 A1* | 12/2016 | Watfa | H04W 72/10 455/41.2 |
| 2017/0302360 A1* | 10/2017 | Aminaka | H04W 88/04 |
| 2018/0191516 A1* | 7/2018 | Wolfner | H04W 8/005 |

FOREIGN PATENT DOCUMENTS

| | | |
|---|---|---|
| WO | 2014133356 A1 | 9/2014 |
| WO | 2015/000912 A1 | 1/2015 |
| WO | 2015017188 A1 | 2/2015 |
| WO | 2016/210048 A1 | 12/2016 |
| WO | 2017/003550 A1 | 1/2017 |
| WO | 2017001581 A1 | 1/2017 |
| WO | 2017/026760 A1 | 2/2017 |

OTHER PUBLICATIONS

Ericsson, "Remote UE resource handling via NWK Relay," TSG-SA, WG2, Meeting #110, Agenda Item: 6.5, Jul. 2015, S2-152268, 8 pgs.
"3$^{rd}$ Generation Partnership Project; Technical Specification Group Services and System Aspects; Proximity-based services (ProSe); Stage 2 (Release 13)," 3GPP TS 23.303, V13.0.0, Jun. 2015, 97 pgs.
"3$^{rd}$ Generation Partnership Project; Technical Specification Group Services and System Aspects; Functional architecture and information flows to support mission critical communication services; Stage 2 (Release 13)," 3GPP TS 23.179, V0.2.0, Jul. 2015, 97 pgs.
International Search Report dated Apr. 28, 2016, in corresponding International Patent Application No. PCT/CN2015/087606, 4 pgs.
Extended European Search Report dated Apr. 30, 2018, in corresponding European Patent Application No. 15901498.4, 13 pgs.
International Search Report dated Apr. 28, 2016 in corresponding International Patent Application No. PCT/CN2015/087606.
3GPP TR 23.713 V1.5.0 (Jul. 2015), "3rd Generation Partnership Project; Technical Specification Group Services and System Aspects; Study on extended architecture support for proximity-based services" (Release 13), total 80 pages.
S2-152820 Huawei, Hisilicon, "ProSe Priority for eMBMS relay" SA WG2 Meeting #110ah, Aug. 31-Sep. 3, 2015, Sophia Antipolis, France, total 3 pages.
Japanese Office Action dated Jan. 29, 2019 in corresponding Japanese Patent Application No. 2018-509609 (4 pages).

\* cited by examiner

DATA PROCESSING METHOD AND DEVICE

CROSS-REFERENCE TO RELATED APPLICATIONS

This application is a continuation of International Application No. PCT/CN2015/087606, filed on Aug. 20, 2015, the disclosure of which is hereby incorporated by reference in its entirety.

TECHNICAL FIELD

Embodiments of the present invention relate to mobile communications technologies, and in particular, to a data processing method and device.

BACKGROUND

In wireless communications, to improve data transmission efficiency, a proximity service (ProSe) technology is used, so that user equipment (UE) beyond network coverage communicates with a network side by using UE within the network coverage as a relay.

For ease of description, the UE beyond the network coverage is referred to as remote UE, and the UE within the network coverage is referred to as relay UE. In the prior art, the relay UE establishes a packet data network (PDN) connection corresponding to a serving/packet data network gateway (S/PGW), to transmit data of the remote UE; the remote UE uses a discovery process in the ProSe technology, to determine relay UE that can provide a service to the remote UE and establish a communication connection with the relay UE; the relay UE allocates an Internet Protocol (IP) address to the remote UE; and after obtaining the IP address, the remote UE communicates with the network side by using the PDN connection between the relay UE and the S/PGW.

However, by means of a method in the prior art, when remote UE transmits data by using a PDN connection of relay UE, quality of service (QoS) of the remote UE cannot be ensured.

SUMMARY

Embodiments of the present invention provide a data processing method and device, so as to ensure Qos of remote UE when the remote UE transmits data by using a PDN connection of relay UE.

According to a first aspect, an embodiment of the present invention provides a data processing method, including:

obtaining, by a policy and charging rules function PCRF entity, subscription information of remote user equipment UE;

determining, by the PCRF entity, a QoS rule of relay UE according to the subscription information and quality of service QoS of the remote UE; and sending, by the PCRF entity, the QoS rule to a packet data network gateway PGW, where the QoS rule is used by the PGW to modify or establish a bearer of the relay UE, and the bearer of the relay UE is used by the relay UE to forward data of the remote UE.

With reference to the first aspect, in a first possible implementation manner of the first aspect, the obtaining, by a PCRF entity, subscription information of remote UE includes:

obtaining, by the PCRF entity, the subscription information of the remote UE from a subscription profile repository SPR according to an identifier of the remote UE.

With reference to the first aspect or the first possible implementation manner of the first aspect, in a second possible implementation manner of the first aspect, before the obtaining, by a PCRF entity, subscription information of remote UE, the method further includes:

receiving, by the PCRF entity, the identifier of the remote UE sent by the PGW.

With reference to the first aspect, or the first possible implementation manner or the second possible implementation manner of the first aspect, in a third possible implementation manner of the first aspect, the method further includes:

storing, by the PCRF entity, the subscription information of the remote UE in a context of the relay UE.

With reference to any one of the first aspect, or the first possible implementation manner to the third possible implementation manner of the first aspect, in a fourth possible implementation manner of the first aspect, before the determining, by the PCRF entity, a QoS rule of relay UE according to the subscription information and service QoS of the remote UE, the method further includes:

receiving, by the PCRF entity, the service QoS from an application function AF entity of the remote UE; or receiving, by the PCRF entity, the service QoS provided by the relay UE.

With reference to any one of the first aspect, or the first possible implementation manner to the fourth possible implementation manner of the first aspect, in a fifth possible implementation manner of the first aspect, the method further includes:

sending, by the PCRF entity, the identifier of the remote UE and a service data flow template to the PGW, where the service data flow template includes information about an IP address and a port number of the remote UE.

According to a second aspect, an embodiment of the present invention provides a data processing method, including:

receiving, by a packet data network gateway PGW, a quality of service QoS rule of relay user equipment UE sent by a policy and charging rules function PCRF entity, where the QoS rule of the relay UE is determined by the PCRF according to subscription information and service QoS of remote UE;

modifying or establishing, by the PGW, a bearer of the relay UE according to the QoS rule of the relay UE; and sending or receiving, by the PGW, data of the remote UE by using the bearer of the relay UE.

With reference to the second aspect, in a first possible implementation manner of the second aspect, before the receiving, by a PGW, a QoS rule of relay UE sent by a PCRF entity, the method further includes:

receiving, by the PGW, an identifier of the remote UE sent by a mobility management entity MME; and sending, by the PGW, the identifier of the remote UE to the PCRF.

According to a third aspect, an embodiment of the present invention provides a data processing method, including:

obtaining, by a mobility management entity MME, an identifier of remote user equipment UE; and sending, by the MME, the identifier of the remote UE to a policy and charging rules function PCRF entity, where the identifier of the remote UE is used by the PCRF entity to obtain subscription information of the remote UE.

With reference to the third aspect, in a first possible implementation manner of the third aspect, the obtaining, by an MME, an identifier of remote UE includes:

receiving, by the MME, the identifier of the remote UE sent by relay UE; or receiving, by the MME, the identifier of the remote UE sent by a proximity service function entity.

With reference to the third aspect or the first possible implementation manner of the third aspect, in a second possible implementation manner of the third aspect, before the sending, by the MME, the identifier of the remote UE to a policy and charging rules function PCRF entity, the method further includes:

performing, by the MME, authorization check on the remote UE.

With reference to the second possible implementation manner of the third aspect, in a third possible implementation manner of the third aspect, the performing, by the MME, authorization check on the remote UE includes:

performing, by the MME, authorization check on the remote UE according to subscription information in a home subscriber server HSS of the remote UE and subscription information in an HSS of the relay UE.

According to a fourth aspect, an embodiment of the present invention provides a data processing method, including:

receiving, by relay user equipment UE, a multimedia broadcast multicast service MBMS monitoring request of remote UE;

obtaining, by the relay UE, quality of service QoS of an MBMS bearer;

determining, by the relay UE according to the QoS of the MBMS bearer, a sending priority of MBMS data to be sent to the remote UE; and sending, by the relay UE, the MBMS data of the remote UE according to the sending priority of the MBMS data of the remote UE.

With reference to the fourth aspect, in a first possible implementation manner of the fourth aspect, the obtaining, by the relay UE, QoS of the MBMS bearer includes:

obtaining, by the relay UE, the QoS of the MBMS bearer from the remote UE; or obtaining, by the relay UE, the QoS of the MBMS bearer from a mobility management entity MME; or obtaining, by the relay UE, the QoS of the MBMS bearer from an evolved NodeB eNB.

With reference to the first possible implementation manner of the fourth aspect, in a second possible implementation manner of the fourth aspect, the MBMS monitoring request message carries the QoS of the MBMS bearer, and the obtaining, by the relay UE, the QoS of the MBMS bearer from the remote UE includes:

obtaining, by the relay UE, the QoS of the MBMS bearer from the MBMS monitoring request message.

With reference to the fourth aspect, in a third possible implementation manner of the fourth aspect, the determining, by the relay UE according to the QoS of the MBMS bearer, a sending priority of MBMS data to be sent to the remote UE includes:

determining, by the relay UE according to the QoS of the MBMS bearer and a correspondence between QoS and a sending priority, the sending priority of the MBMS data to be sent to the remote UE.

With reference to the third possible implementation manner of the fourth aspect, in a fourth possible implementation manner of the fourth aspect, the correspondence is configured by a proximity service function entity or an MME for the relay UE.

According to a fifth aspect, an embodiment of the present invention provides a data processing method, including:

obtaining, by relay user equipment UE, service quality of service QoS of remote UE;

determining, by the relay UE, QoS of a bearer of the relay UE according to the service QoS of the remote UE;

determining, by the relay UE according to the determined QoS of the bearer of the relay UE, to initiate modification on the bearer of the relay UE; and forwarding, by the relay UE, data of the remote UE by using the modified bearer.

With reference to the fifth aspect, in a first possible implementation manner of the fifth aspect, the obtaining, by relay UE, service QoS of remote UE includes:

receiving, by the relay UE, a data or signaling message sent by the remote UE, where the data or signaling message includes the service QoS of the remote UE; and obtaining, by the relay UE, the service QoS of the remote UE from the data or signaling message sent by the remote UE.

With reference to the fifth aspect or the first possible implementation manner of the fifth aspect, in a second possible implementation manner of the fifth aspect, the service QoS includes a sending priority of the data of the remote UE or a differentiated services code point DSCP value in the data.

With reference to the fifth aspect, or the first possible implementation manner of the fifth aspect, or the second possible implementation manner of the fifth aspect, in a third possible implementation manner of the fifth aspect, the determining, by the relay UE, QoS of a bearer of the relay UE according to the service QoS of the remote UE includes:

determining, by the relay UE, the QoS of the bearer of the relay UE according to a correspondence between service QoS and QoS of a bearer, and the service QoS of the remote UE.

With reference to the third possible implementation manner of the fifth aspect, in a fourth possible implementation manner of the fifth aspect, the correspondence is configured by a proximity service function entity or a mobility management entity MME for the relay UE.

With reference to the fifth aspect, in a fifth possible implementation manner of the fifth aspect, the determining, by the relay UE according to the determined QoS of the bearer of the relay UE, to initiate modification on the bearer of the relay UE includes:

sending, by the relay UE, a bearer modification request message to an MME, where the bearer modification request message includes the determined QoS, an identifier of the remote UE, and packet filter information, and the packet filter information includes an IP address and a port number of the remote UE.

According to a sixth aspect, an embodiment of the present invention provides a data processing device, including:

an obtaining module, configured to obtain subscription information of remote user equipment UE;

a determining module, configured to determine a QoS rule of relay UE according to the subscription information and service quality of service QoS of the remote UE; and a sending module, configured to send the QoS rule to a packet data network gateway PGW, where the QoS rule is used by the PGW to modify or establish a bearer of the relay UE, and the bearer of the relay UE is used by the relay UE to forward data of the remote UE.

With reference to the sixth aspect, in a first possible implementation manner of the sixth aspect, the obtaining module is specifically configured to:

obtain the subscription information of the remote UE from a subscription profile repository SPR according to an identifier of the remote UE.

With reference to the sixth aspect or the first possible implementation manner of the sixth aspect, in a second possible implementation manner of the sixth aspect, the device further includes:

a first receiving module, configured to receive the identifier of the remote UE sent by the PGW.

With reference to the sixth aspect, or the first possible implementation manner or the second possible implementation manner of the sixth aspect, in a third possible implementation manner of the sixth aspect, the device further includes:

a storage module, configured to store the subscription information of the remote UE in a context of the relay UE.

With reference to any one of the sixth aspect, or the first possible implementation manner to the third possible implementation manner of the sixth aspect, in a fourth possible implementation manner of the sixth aspect, the apparatus further includes: a second receiving module, configured to receive the service QoS from an application function AF entity of the remote UE; or a third receiving module, configured to receive the service QoS provided by the relay UE.

With reference to any one of the sixth aspect, or the first possible implementation manner to the fourth possible implementation manner of the sixth aspect, in a fifth possible implementation manner of the sixth aspect, the sending module is further configured to send the identifier of the remote UE and a service data flow template to the PGW, where the service data flow template includes information about an IP address and a port number of the remote UE.

According to a seventh aspect, an embodiment of the present invention provides a data processing device, including:

a first receiving module, configured to receive a quality of service QoS rule of relay user equipment UE sent by a policy and charging rules function PCRF entity, where the QoS rule of the relay UE is determined by the PCRF according to subscription information and service QoS of remote UE;

a bearer processing module, configured to modify or establish a bearer of the relay UE according to the QoS rule of the relay UE; and a transmission module, configured to send or receive data of the remote UE by using the bearer of the relay UE.

With reference to the seventh aspect, in a first possible implementation manner of the seventh aspect, the device further includes:

a second receiving module, configured to receive an identifier of the remote UE sent by a mobility management entity MME; and a sending module, configured to send the identifier of the remote UE to the PCRF.

According to an eighth aspect, an embodiment of the present invention provides a data processing device, including:

an obtaining module, configured to obtain an identifier of remote user equipment UE; and a sending module, configured to send the identifier of the remote UE to a policy and charging rules function PCRF entity, where the identifier of the remote UE is used by the PCRF entity to obtain subscription information of the remote UE.

With reference to the eighth aspect, in a first possible implementation manner of the eighth aspect, the obtaining module is specifically configured to receive the identifier of the remote UE sent by relay UE; or configured to receive the identifier of the remote UE sent by a proximity service function entity.

With reference to the eighth aspect or the first possible implementation manner of the eighth aspect, in a second possible implementation manner of the eighth aspect, the device further includes:

an authorization check module, configured to perform authorization check on the remote UE.

With reference to the second possible implementation manner of the eighth aspect, in a third possible implementation manner of the eighth aspect, the authorization check module is specifically configured to perform authorization check on the remote UE according to subscription information in a home subscriber server HSS of the remote UE and subscription information in an HSS of the relay UE.

According to a ninth aspect, an embodiment of the present invention provides a data processing device, including:

a receiving module, configured to receive a multimedia broadcast multicast service MBMS monitoring request of remote UE;

an obtaining module, configured to obtain quality of service QoS of an MBMS bearer;

a determining module, configured to determine, according to the QoS of the MBMS bearer, a sending priority of MBMS data to be sent to the remote UE; and a sending module, configured to send the MBMS data of the remote UE according to the sending priority of the MBMS data of the remote UE.

With reference to the ninth aspect, in a first possible implementation manner of the ninth aspect, the obtaining module is specifically configured to obtain the QoS of the MBMS bearer from the remote UE; or configured to obtain the QoS of the MBMS bearer from a mobility management entity MME; or configured to obtain the QoS of the MBMS bearer from an evolved NodeB eNB.

With reference to the first possible implementation manner of the ninth aspect, in a second possible implementation manner of the ninth aspect, the MBMS monitoring request message carries the QoS of the MBMS bearer, and the obtaining module is specifically configured to obtain the QoS of the MBMS bearer from the MBMS monitoring request message.

With reference to the ninth aspect, in a third possible implementation manner of the ninth aspect, the determining module is specifically configured to determine, according to the QoS of the MBMS bearer and a correspondence between QoS and a sending priority, the sending priority of the MBMS data to be sent to the remote UE.

With reference to the third possible implementation manner of the ninth aspect, in a fourth possible implementation manner of the ninth aspect, the correspondence is configured by a proximity service function entity or an MME for the relay UE.

According to a tenth aspect, an embodiment of the present invention provides a data processing device, including:

an obtaining module, configured to obtain service quality of service QoS of remote UE;

a determining module, configured to determine QoS of a bearer of the relay UE according to the service QoS of the remote UE;

a modification module, configured to determine, according to the determined QoS of the bearer of the relay UE, to initiate modification on the bearer of the relay UE; and a forwarding module, configured to forward data of the remote UE by using the modified bearer.

With reference to the tenth aspect, in a first possible implementation manner of the tenth aspect, the obtaining module includes:

a receiving unit, configured to receive a data or signaling message sent by the remote UE, where the data or signaling message includes the service QoS of the remote UE; and an obtaining unit, configured to obtain the service QoS of the remote UE from the data or signaling message sent by the remote UE.

With reference to the tenth aspect or the first possible implementation manner of the tenth aspect, in a second possible implementation manner of the tenth aspect, the service QoS includes a sending priority of the data of the remote UE or a differentiated services code point DSCP value in the data.

With reference to the tenth aspect, or the first possible implementation manner of the tenth aspect, or the second possible implementation manner of the tenth aspect, in a third possible implementation manner of the tenth aspect, the determining module is specifically configured to determine the QoS of the bearer of the relay UE according to a correspondence between service QoS and QoS of a bearer, and the service QoS of the remote UE.

With reference to the third possible implementation manner of the tenth aspect, in a fourth possible implementation manner of the tenth aspect, the correspondence is configured by a proximity service function entity or a mobility management entity MME for the relay UE.

With reference to the tenth aspect, in a fifth possible implementation manner of the tenth aspect, the determining, by the relay UE according to the determined QoS of the bearer of the relay UE, to initiate modification on the bearer of the relay UE includes:

sending, by the relay UE, a bearer modification request message to an MME, where the bearer modification request message includes the determined QoS, an identifier of the remote UE, and packet filter information, and the packet filter information includes an IP address and a port number of the remote UE.

According to an eleventh aspect, an embodiment of the present invention provides a data processing device, including:

a processor, configured to obtain subscription information of remote user equipment UE, where the processor is further configured to determine a QoS rule of relay UE according to the subscription information and service quality of service QoS of the remote UE; and a transmitter, configured to send the QoS rule to a packet data network gateway PGW, where the QoS rule is used by the PGW to modify or establish a bearer of the relay UE, and the bearer of the relay UE is used by the relay UE to forward data of the remote UE.

According to a twelfth aspect, an embodiment of the present invention provides a data processing device, including:

a transceiver, configured to receive a quality of service QoS rule of relay user equipment UE sent by a policy and charging rules function PCRF entity, where the QoS rule of the relay UE is determined by the PCRF according to subscription information and service QoS of remote UE; and a processor, configured to modify or establish a bearer of the relay UE according to the QoS rule of the relay UE, where the transceiver is further configured to send or receive data of the remote UE by using the bearer of the relay UE.

According to a thirteenth aspect, an embodiment of the present invention provides a data processing device, including:

a processor, configured to obtain an identifier of remote user equipment UE; and a transmitter, configured to send the identifier of the remote UE to a policy and charging rules function PCRF entity, where the identifier of the remote UE is used by the PCRF entity to obtain subscription information of the remote UE.

According to a fourteenth aspect, an embodiment of the present invention provides a data processing device, including:

a receiver, configured to receive a multimedia broadcast multicast service MBMS monitoring request of remote UE;

a processor, configured to obtain quality of service QoS of an MBMS bearer, where the processor is configured to determine, according to the QoS of the MBMS bearer, a sending priority of MBMS data to be sent to the remote UE; and a transmitter, configured to send the MBMS data of the remote UE according to the sending priority of the MBMS data of the remote UE.

According to a fifteenth aspect, an embodiment of the present invention provides a data processing device, including:

a processor, configured to obtain service quality of service QoS of remote UE, where the processor is further configured to determine QoS of a bearer of the relay UE according to the service QoS of the remote UE; and the processor is further configured to determine, according to the determined QoS of the bearer of the relay UE, to initiate modification on the bearer of the relay UE; and a transmitter, configured to forward data of the remote UE by using the modified bearer.

According to the data processing method and device provided in the embodiments, a PCRF entity obtains subscription information of remote UE, and determines a QoS rule of relay UE according to the subscription information and service QoS of the remote UE, and the PCRF entity sends the QoS rule of the relay UE to a PGW, where the QoS rule is used by the PGW to modify or establish a bearer of the relay UE, and the bearer of the relay UE is used by the relay UE to forward data of the remote UE. When the remote UE communicates with a network side by using the relay UE, the PCRF entity can determine the QoS rule of the relay UE according to the subscription information and the service QoS of the remote UE, so that the PGW modifies or establishes the bearer of the relay UE according to the QoS rule of the relay UE, and the relay UE forwards the data of the remote UE on the bearer of the relay UE, thereby ensuring the service QoS of the remote UE.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A data processing method provided in the present invention may be applied in an application scenario in which a ProSe technology is used: remote UE communicates with a network side by using relay UE, where the remote UE is UE beyond network coverage or UE whose signal within the network coverage is poor, and the relay UE is UE within the network coverage or UE whose signal within the network coverage is relatively good. A policy and charging rules function (PCRF) entity obtains subscription information of the remote UE, and determines a QoS rule of the relay UE according to the subscription information and service quality of service (QoS) of the remote UE. The PCRF entity sends the QoS rule of the relay UE to a packet data network gateway (PGW), where the QoS rule is used by the PGW to modify or establish a bearer of the relay UE, and the bearer of the relay UE is used by the relay UE to forward data of the remote UE. When the remote UE communicates with the network side by using the relay UE, the PCRF entity can determine the QoS rule of the relay UE according to the subscription information and the service QoS of the remote UE, so that the PGW modifies or establishes the bearer of the relay UE according to the QoS rule of the relay UE, and the relay UE forwards the data of the remote UE on the bearer of the relay UE, thereby ensuring the service QoS of the remote UE.

The technical solutions of the present invention are described in detail below by using specific embodiments. The following specific embodiments may be combined with each other, and same or similar concepts or processes may be not described in some embodiments.

Figure 1:
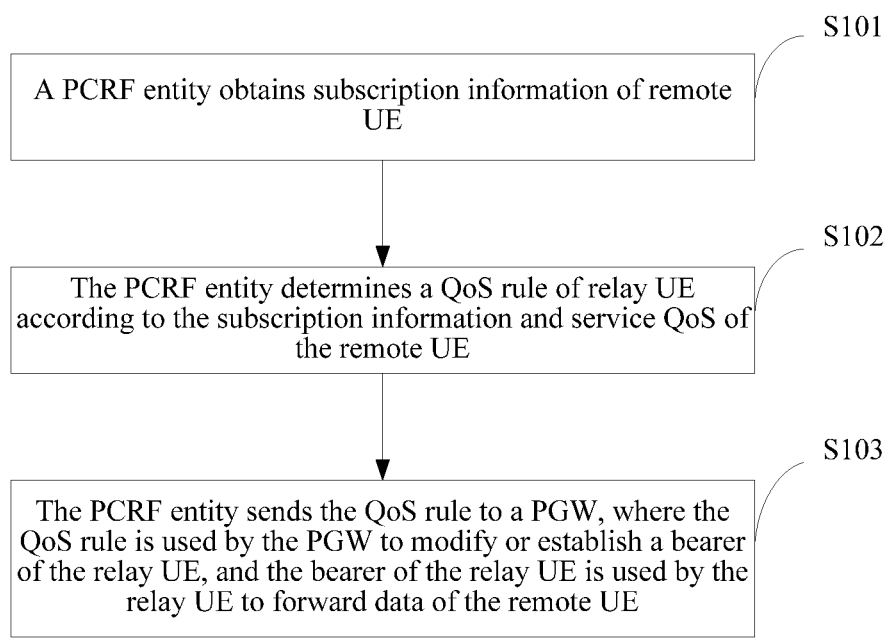
FIG. 1 is a schematic flowchart of Embodiment 1 of a data processing method according to an embodiment of the present invention.

FIG. 1 is a schematic flowchart of Embodiment 1 of a data processing method according to an embodiment of the present invention. As shown in FIG. 1, the data processing method provided in this embodiment includes the following steps.

S101: A PCRF entity obtains subscription information of remote UE.

Specifically, in a ProSe application scenario, relay UE establishes a PDN connection in a network attachment process; and the remote UE discovers, by using a discovery process, relay UE that can provide data transmission to the remote UE, which may be that the relay UE sends a broadcast message, and the remote UE discovers the relay UE by using the broadcast message. The remote UE establishes one-to-one communication with the relay UE, which may be that the remote UE sends a communication request to the relay UE, to establish one-to-one communication, where the communication request includes an identifier of the remote UE. The relay UE sends the identifier of the remote UE to a mobility management entity (MME), the MME sends the identifier of the remote UE to a PGW, and the PGW sends the identifier of the remote UE to a PCRF.

The PCRF entity may obtain the subscription information of the remote UE according to the identifier of the remote UE. The subscription information of the remote UE may be subscription information, such as a type of a service that may be initiated, a data transfer rate, a bandwidth, a delay, and a packet error rate, when the remote UE accesses a network.

It should be noted that the identifier of the remote UE may be further transmitted by the relay UE to the PCRF entity by using another network element, and this embodiment is not limited thereto as long as the PCRF entity can finally obtain the identifier of the remote UE.

S102: The PCRF entity determines a QoS rule of relay UE according to the subscription information and service QoS of the remote UE.

Specifically, the PCRF entity needs to obtain the service QoS. The service QoS is a QoS requirement of a specific service initiated by the remote UE. For example, for a voice service initiated by the remote UE, the service QoS is a QoS requirement of the voice service. The PCRF entity may obtain the service QoS from an application function (AF) entity of the remote UE, or may obtain the service QoS from the relay UE, and this embodiment is not limited thereto.

It should be noted that, when determining the QoS rule of the relay UE, the PCRF further needs to refer to subscription information of the relay UE that is already stored in the PCRF entity.

The PCRF entity may first determine, according to the subscription information of the remote UE, whether the remote UE can send the service, where a type of the service herein refers to a type of a service corresponding to the service QoS obtained by the PCRF entity. If the remote UE can initiate the service, the PCRF entity then determines whether the subscription information of the relay UE can satisfy the service QoS, and if the subscription information of the relay UE can satisfy the service QoS, the PCRF entity may determine that the service QoS is the QoS rule of the relay UE. Certainly, if the subscription information of the relay UE can satisfy the service QoS, the PCRF entity may also determine that any QoS that is greater than the service QoS and is less than or equal to the subscription information of the relay UE is the QoS rule of the relay UE.

S103: The PCRF entity sends the QoS rule to a PGW, where the QoS rule is used by the PGW to modify or establish a bearer of the relay UE, and the bearer of the relay UE is used by the relay UE to forward data of the remote UE.

Specifically, the PCRF entity sends the QoS rule to the PGW. The PGW performs processing on the bearer of the relay UE according to the QoS rule, which includes: performing, by the PGW, bearer establishment or bearer modification according to the QoS rule. The PGW sends signaling to a serving gateway (S-GW), and the S-GW sends the signaling to a network element such as an MME, so that the PGW modifies or establishes the bearer of the relay UE. The bearer of the relay UE is used by the relay UE to forward uplink data or downlink data of the remote UE.

Optionally, in this embodiment, the QoS rule may be further used by the PGW to delete the bearer of the relay UE.

According to the data processing method provided in this embodiment, a PCRF entity obtains subscription information of remote UE, and determines a QoS rule of relay UE according to the subscription information and service QoS of the remote UE, and the PCRF entity sends the QoS rule of the relay UE to a PGW, where the QoS rule is used by the PGW to modify or establish a bearer of the relay UE, and the bearer of the relay UE is used by the relay UE to forward data of the remote UE. When the remote UE communicates with a network side by using the relay UE, the PCRF entity can determine the QoS rule of the relay UE according to the subscription information and the service QoS of the remote UE, so that the PGW modifies or establishes the bearer of the relay UE according to the QoS rule of the relay UE, and the relay UE forwards the data of the remote UE on the bearer of the relay UE, thereby ensuring the service QoS of the remote UE.

Figure 2:
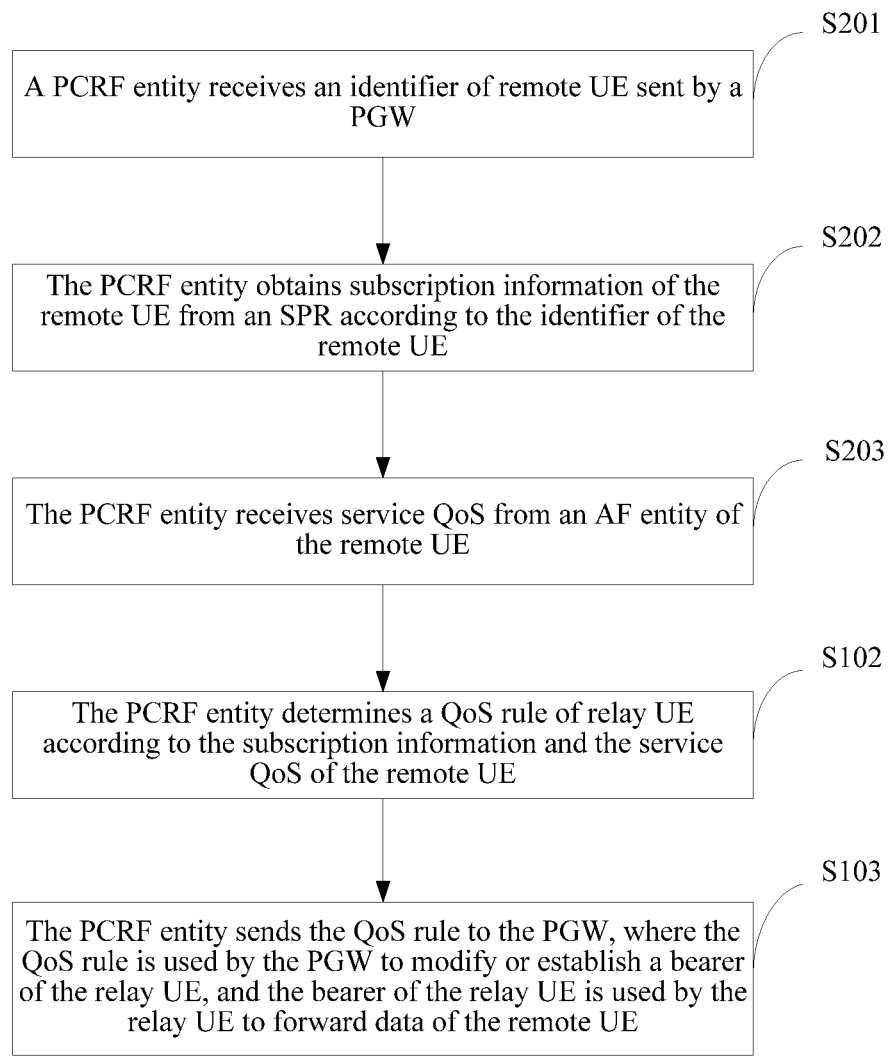
FIG. 2 is a schematic flowchart of Embodiment 2 of a data processing method according to an embodiment of the present invention.

FIG. 2 is a schematic flowchart of Embodiment 2 of a data processing method according to an embodiment of the present invention. Based on Embodiment 1, before S101, the method further includes:

S201: A PCRF entity receives an identifier of remote UE sent by a PGW.

Specifically, there may be the following three implementation manners:

A first implementation manner: The identifier of the remote UE may be an international mobile subscriber identity (IMSI). When the identifier of the remote UE is an IMSI, the remote UE may include the IMSI to a communication request and send the request to relay UE, and the relay UE may include the IMSI of the remote UE to a non-access stratum (NAS) message and send the message to an MME. The MME performs authorization check on the remote UE according to the IMSI of the remote UE. The MME may perform authorization check on the remote UE by using subscription information read from home subscriber servers (HSS) of the relay UE and the remote UE. The authorization check includes: whether the remote UE can use the relay UE to perform data transmission with a network side, and whether the remote UE can trigger bearer establishment or modification of the relay UE. After performing authorization check on the remote UE, the MME sends the IMSI of the remote UE to the PGW by using a GPRS Tunnelling Protocol (GTP) message, and the PCRF entity receives the IMSI of the remote UE sent by the PGW.

It should be noted that the relay UE may also add the identifier of the remote UE, that is, the IMSI, to a protocol configuration option (PCO) and send the PCO to the MME; in this case, the MME does not parse the PCO. Therefore, in this case, the MME does not perform authorization check on the remote UE, but directly sends the identifier of the remote UE to the PGW, and the PCRF entity receives the IMSI of the remote UE sent by the PGW.

A second implementation manner: The identifier of the remote UE may be a temporary identifier, and the temporary identifier may be allocated by a proximity service function (ProSe Function) entity to the remote UE. The remote UE sends the temporary identifier to relay UE, the relay UE may send the temporary identifier to an MME by using an NAS message, and the MME obtains, according to the temporary identifier, an IMSI corresponding to the temporary identifier from the proximity service function entity. After the MME obtains the IMSI of the remote UE, the remaining steps of the implementation manner are the same as that of the first implementation manner, and details are not described herein.

It should be noted that, in this implementation manner, the temporary identifier of the remote UE may also be allocated by the MME. If the temporary identifier of the remote UE is allocated by the MME, the remote UE sends the temporary identifier to the relay UE, the relay UE may send the temporary identifier to the MME by using the NAS message, and the MME obtains, according to the temporary identifier, the IMSI corresponding to the temporary identifier.

A third implementation manner: The remote UE adds the identifier of the remote UE to a communication request and sends the request to relay UE, and the relay UE sends the identifier of the remote UE to a proximity service function entity by using a PC3 interface that is an interface between the relay UE and the proximity service function entity. The proximity service function entity sends the identifier of the remote UE to an MME by using an HSS, or the proximity service function entity directly sends the identifier of the remote UE to an MME.

Similarly, the identifier of the remote UE may be an IMSI. If the identifier of the remote UE is an IMSI, after the MME obtains the IMSI, the remaining steps of the implementation manner are the same as that of the first implementation manner, and details are not described herein. If the identifier of the remote UE is a temporary identifier, after the MME obtains the temporary identifier, the remaining steps of the implementation manner are the same as that of the second implementation manner, and details are not describe herein.

This embodiment is based on Embodiment 1, and S101 specifically includes:

S202: The PCRF entity obtains the subscription information of the remote UE from an SPR according to the identifier of the remote UE.

Specifically, the PCRF entity obtains the subscription information of the remote UE from the subscription profile repository (SPR). The subscription information includes a type of a service that the remote UE is allowed to initiate, a policy and charging control (PCC) rule of the remote UE, and the like.

Further, after obtaining the subscription information of the remote UE, the PCRF stores the subscription information of the remote UE in a context of the relay UE. The context of the relay UE represents information, stored in the PCRF, about the relay UE, for example, the subscription information of the relay UE.

Based on Embodiment 1, before S102, the method further includes:

S203: The PCRF entity receives service QoS from an AF entity of the remote UE.

Specifically, after the PCRF obtains the subscription information of the remote UE, the remote UE may send service request signaling to the AF entity of the remote UE by using a PDN connection of the relay UE. After receiving the service request signaling of the remote UE, the AF entity sends the service QoS of the remote UE to the PCRF entity according to the service request signaling. The service QoS may include information such as a type of a service, a bandwidth required by the service, and a transmission rate.

Figure 3:
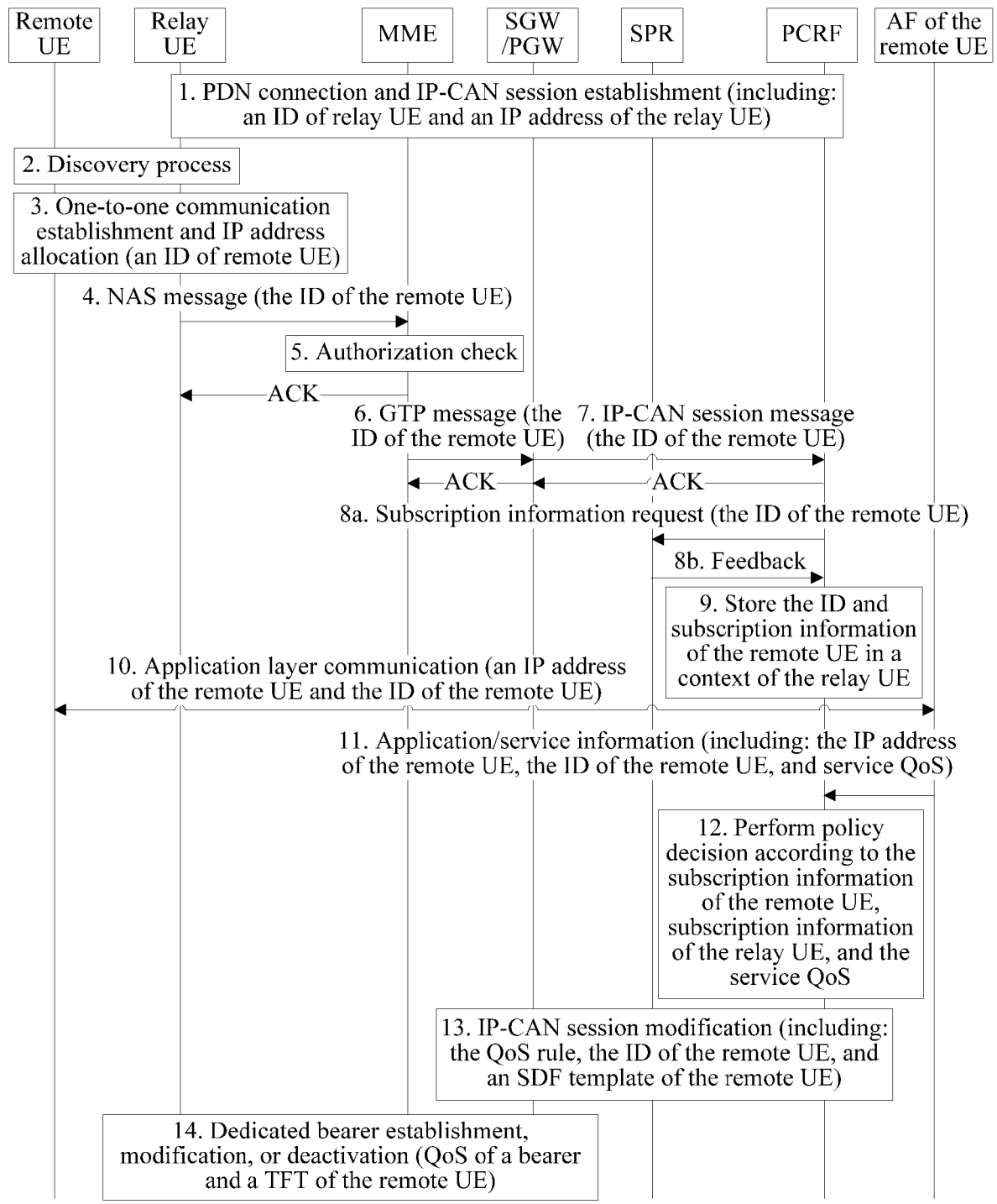
FIG. 3 is a schematic signaling flowchart of a first implementation manner according to Embodiment 2 of the present invention.

FIG. 3 is a schematic signaling flowchart of a first implementation manner according to Embodiment 2 of the present invention. As shown in FIG. 3, a data processing method provided in this implementation manner includes:

Step 1: Relay UE establishes a PDN connection and establishes an IP-CAN session, including: an ID of the relay UE and an IP address of the relay UE, where the relay UE sends the ID of the relay UE and the IP address of the relay UE to a network element on a network side, and specifically, the relay UE may establish a PDN connection with the network side by using a network attachment process.

Step 2: A discovery process: Remote UE discovers, by using the discovery process, relay UE that can provide a relay service to the remote UE.

Step 3: One-to-one communication establishment and IP address allocation, including an ID of the remote UE: The remote UE establishes one-to-one communication with the relay UE, and the relay UE allocates an IP address to the remote UE, where the remote UE may include the identifier (ID) of the remote UE to a communication request.

Step 4: The relay UE sends an NAS message including the ID of the remote UE to an MME.

Step 5: Authorization check: The MME obtains, according to the ID of the remote UE, subscription information of the remote UE in an HSS and subscription information of the relay UE in an HSS, and performs authorization check on the remote UE.

If the authorization check is successful, step 6 is performed: The MME sends a GTP message including the ID of the remote UE to a PGW, where the MME adds the identifier of the remote UE to the GTP message and sends the GTP message to the PGW.

Step 7: The PGW sends an IP-CAN session message including the ID of the remote UE to a PCRF, where the PGW sends the identifier of the remote UE to the PCRF by using an IP-CAN session process.

Step 8a: A subscription information request including the ID of the remote UE: The PCRF entity obtains the subscription information of the remote UE from an SPR according to the identifier of the remote UE.

Step 8b: A feedback: The SPR feeds back the subscription information of the remote UE to the PCRF.

Step 9: The PCRF entity stores the ID and the subscription information of the remote UE in a context of the relay UE.

Step 10: Application layer communication including the IP address of the remote UE and the ID of the remote UE: The remote UE performs application layer communication with an AF entity of the remote UE, and the remote UE may send service request signaling to the AF, where the service request signaling includes the IP address of the remote UE and the identifier of the remote UE.

Step 11: The AF entity of the remote UE sends application/service information, including: the IP address of the remote UE, the ID of the remote UE, and service QoS, to the PCRF.

Step 12: The PCRF performs policy decision according to the subscription information of the remote UE, the subscription information of the relay UE, and the service QoS, where the PCRF determines a QoS rule of the relay UE according to subscription QoS rules of the remote UE and the relay UE.

Step 13: The PCRF initiates IP-CAN session modification, including: the QoS rule, the ID of the remote UE, and an SDF template of the remote UE, where the IP-CAN session includes the QoS rule of the relay UE, the identifier of the remote UE, and the service data flow template (SDF) of the remote UE, and the SDF includes the IP address and a port number of the remote UE.

Step 14: Dedicated bearer establishment, modification, or deactivation, including QoS of a bearer and a TFT of the remote UE: The PGW establishes, modifies, or deactivates a dedicated bearer according to the QoS rule.

Figure 4:
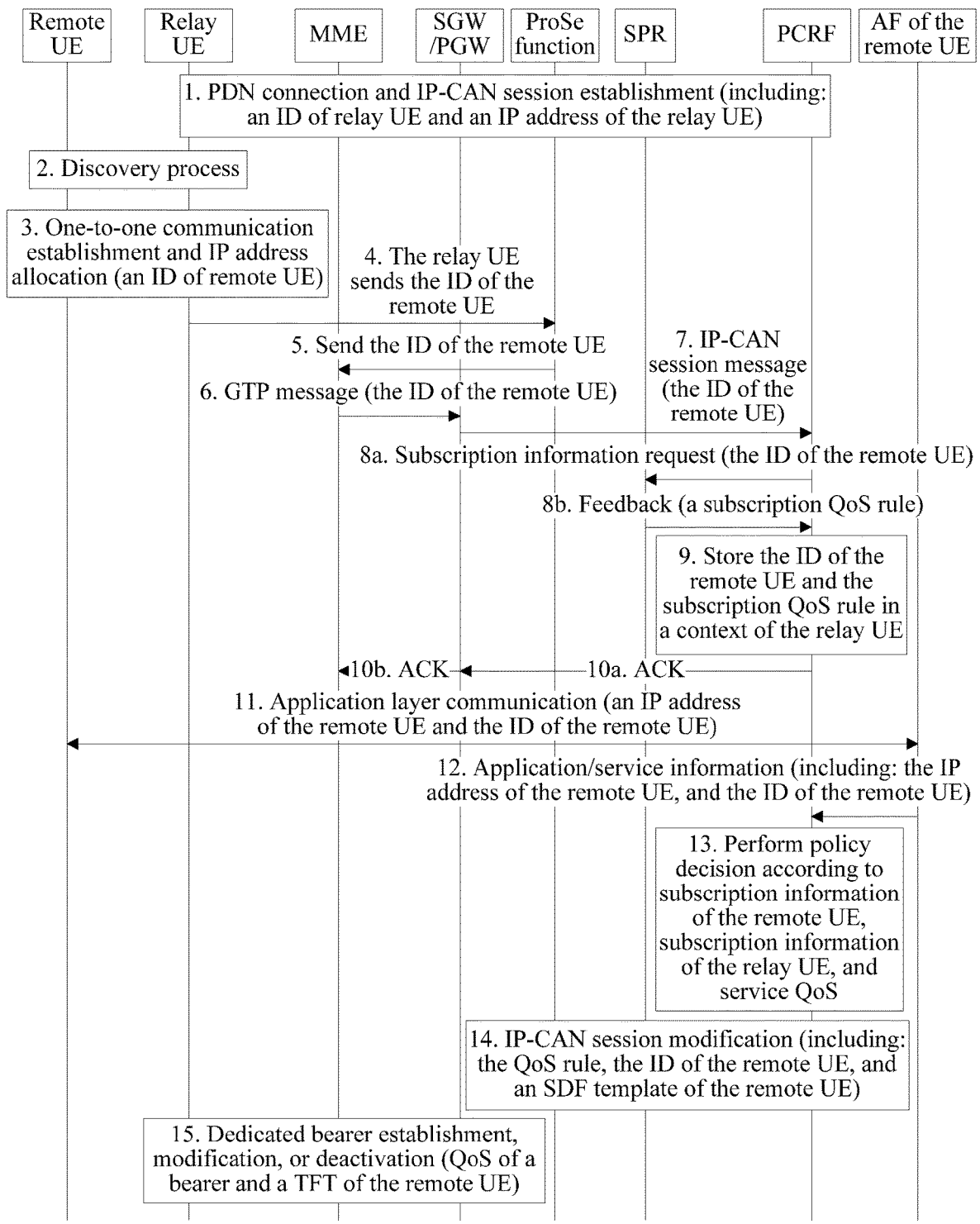
FIG. 4 is a schematic signaling flowchart of a second implementation manner according to Embodiment 2 of the present invention.

FIG. 4 is a schematic signaling flowchart of a second implementation manner according to Embodiment 2 of the present invention. As shown in FIG. 4, a difference between a bearer processing method provided in this implementation manner and the bearer processing method provided in FIG. 3 is that processes of reporting the identifier of the remote UE are different. Step 1 to step 3 in FIG. 4 are the same as those in the implementation manner shown in FIG. 3, and details are not described herein.

Step 4: The relay UE sends the ID of the remote UE, where the relay UE sends the identifier of the remote UE to a proximity service function entity by using an interface between the relay UE and the proximity service function entity.

Step 5: Send the ID of the remote UE, where the proximity service function entity sends the identifier of the remote UE to an MME. Step 6 to step 9 are the same as those in the implementation manner shown in FIG. 3, and details are not described herein.

Step 10a to Step 10b: An acknowledgement message (ACK).

Step 11: Application layer communication, including the IP address of the remote UE and the ID of the remote UE: The remote UE performs application layer communication with an AF entity of the remote UE, and the remote UE may send service request signaling to the AF, where the service request signaling includes the IP address of the remote UE and the identifier of the remote UE.

Step 12: The AF entity of the remote UE sends application/service information, including: the IP address of the remote UE and the ID of the remote UE, to the PCRF.

Step 13: The PCRF performs policy decision according to the subscription information of the remote UE, the subscription information of the relay UE, and service QoS, where the PCRF determines a QoS rule of the relay UE according to subscription QoS rules of the remote UE and the relay UE.

Step 14: The PCRF initiates IP-CAN session modification including the QoS rule, the ID of the remote UE, and an SDF template of the remote UE, where the IP-CAN session includes the QoS rule of the relay UE, the identifier of the remote UE, and the service data flow template (SDF) of the remote UE, and the SDF includes the IP address and a port number of the remote UE.

Step 15: Dedicated bearer establishment, modification, or deactivation, including QoS of a bearer and a TFT of the remote UE: The PGW establishes, modifies, or deactivates a dedicated bearer according to the QoS rule.

According to the data processing method provided in this embodiment, a PCRF receives an identifier of remote UE sent by a PGW, obtains subscription information of the remote UE from an SPR according to the identifier of the remote UE, and receives service QoS from an AF entity of the remote UE, so that the PCRF may perform bearer establishment or modification according to the subscription information and the service QoS of the remote UE, to establish a dedicated bearer meeting the service QoS of the remote UE for the remote UE, thereby ensuring service QoS when the remote UE interacts with a network side, and improving performance when the remote UE interacts with the network side.

Further, based on Embodiment 1 and Embodiment 2, before S102, the method may further include:
receiving, by the PCRF entity, the service QoS provided by the relay UE, where specifically, after the remote UE establishes one-to-one communication with the relay UE, the relay UE allocates the IP address to the remote UE, the remote UE sends an IP packet or a signaling message to the relay UE, and the relay UE sends service QoS of the IP packet to the PCRF.

Further, in any one of the foregoing embodiments, the data processing method further includes: sending, by the PCRF entity, the identifier of the remote UE and a service data flow template to the PGW, where the service data flow template includes information about an IP address and a port number of the remote UE, and the port number refers to a port number of a transport layer of the remote UE, for example, a User Datagram Protocol (UDP) port number. The PGW may charge for the bearer according to the identifier of the remote UE.

Figure 5:
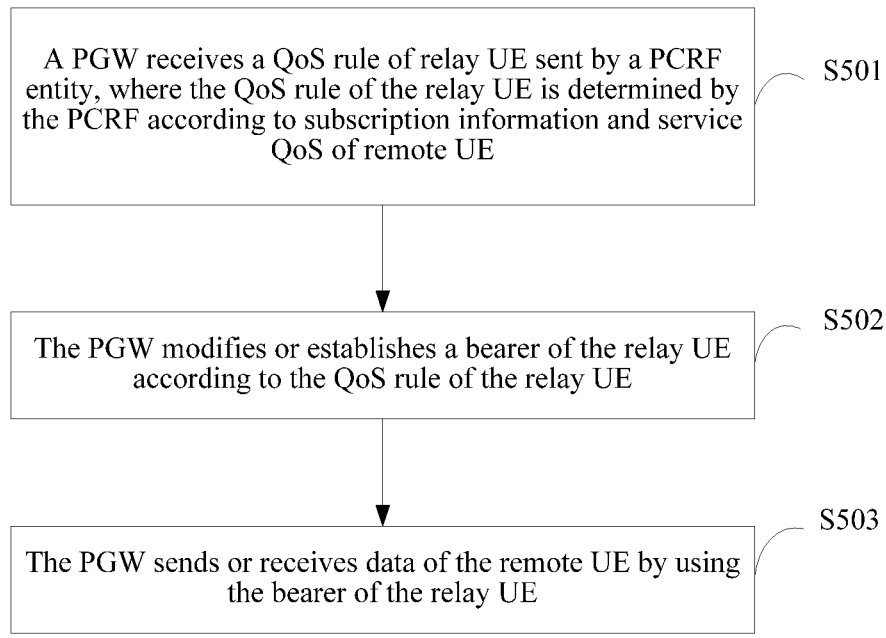
FIG. 5 is a schematic flowchart of Embodiment 3 of a data processing method according to an embodiment of the present invention.

FIG. 5 is a schematic flowchart of Embodiment 3 of a data processing method according to an embodiment of the present invention. As shown in FIG. 5, the data processing method provided in this embodiment includes the following steps.

S501: A PGW receives a QoS rule of relay UE sent by a PCRF entity, where the QoS rule of the relay UE is determined by the PCRF according to subscription information and service QoS of remote UE.

Specifically, the PCRF entity may obtain the subscription information of the remote UE according to an identifier of the remote UE, and the PCRF entity may obtain the service QoS from an AF entity of the remote UE.

The PCRF entity may first determine, according to the subscription information of the remote UE, whether the remote UE can send the service, where a type of the service herein refers to a type of a service corresponding to the service QoS obtained by the PCRF entity. If the remote UE can initiate the service, the PCRF entity then determines whether subscription information of the relay UE can satisfy the service QoS, and if the subscription information of the relay UE can satisfy the service QoS, the PCRF entity may determine that the service QoS is the QoS rule of the relay UE. Certainly, if the subscription information of the relay UE can satisfy the service QoS, the PCRF entity may also determine that any QoS that is greater than the service QoS and is less than or equal to the subscription information of the relay UE is the QoS rule of the relay UE.

S502: The PGW modifies or establishes a bearer of the relay UE according to the QoS rule of the relay UE.

Specifically, the PGW processes the bearer of the relay UE according to the QoS rule of the relay UE, which includes: performing, by the PGW, bearer establishment or bearer modification according to the QoS rule. The PGW sends signaling to a serving gateway (SGW), and the SGW sends the signaling to a network element such as an MME, so that the PGW modifies or establishes the bearer of the relay UE. The bearer of the relay UE is used by the relay UE to forward uplink data or downlink data of the remote UE.

S503: The PGW sends or receives data of the remote UE by using the bearer of the relay UE.

Specifically, the PGW may send the data of the remote UE to the relay UE, or the PGW receives the data of the remote UE sent by the relay UE.

Further, before S501, the PGW receives the identifier of the remote UE sent by the MME, and the PGW sends the identifier of the remote UE to the PCRF.

According to the data processing method provided in this embodiment, a PGW receives a QoS rule of relay UE sent by a PCRF entity, where the QoS rule of the relay UE is determined by the PCRF according to subscription information and service QoS of remote UE, the PGW modifies or establishes a bearer of the relay UE according to the QoS rule of the relay UE, and the PGW sends or receives data of the remote UE by using the bearer of the relay UE. This enables the PCRF entity to determine the QoS rule of the relay UE according to the subscription information and the service QoS of the remote UE, so that the PGW modifies or establishes the bearer of the relay UE according to the QoS rule of the relay UE, and the PGW sends or receives the data of the remote UE by using the bearer of the relay UE, thereby ensuring the service QoS of the remote UE.

Figure 6:
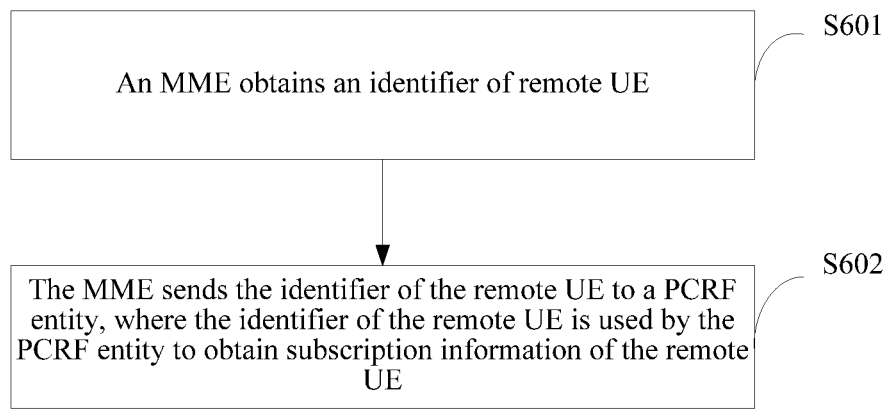
FIG. 6 is a schematic flowchart of Embodiment 4 of a data processing method according to an embodiment of the present invention.

FIG. 6 is a schematic flowchart of Embodiment 4 of a data processing method according to an embodiment of the present invention. As shown in FIG. 6, the data processing method provided in this embodiment includes the following steps.

S601: An MME obtains an identifier of remote UE.

Specifically, the MME receives the identifier of the remote UE sent by relay UE, or the MME receives the identifier of the remote UE sent by a proximity service function entity.

The identifier of the remote UE may be an international mobile subscriber identity (IMSI). When the identifier of the remote UE is an IMSI, the remote UE may include the IMSI to a communication request and send the request to the relay UE, and the relay UE may include the IMSI of the remote UE to an NAS message and send the message to the MME. The MME receives the identifier of the remote UE sent by the relay UE.

The identifier of the remote UE may be a temporary identifier, and the temporary identifier may be allocated by the proximity service function entity to the remote UE. The remote UE sends the temporary identifier to the relay UE, the relay UE may send the temporary identifier to the MME by using an NAS message, and the MME obtains, according to the temporary identifier, an IMSI corresponding to the temporary identifier from the proximity service function entity.

Alternatively, the remote UE adds the identifier of the remote UE to a communication request and sends the request to the relay UE, and the relay UE sends the identifier of the remote UE to the proximity service function entity by using a PC3 interface that is an interface between the relay UE and the proximity service function entity. The proximity service function entity sends the identifier of the remote UE to the MME by using an HSS, or the proximity service function entity directly sends the identifier of the remote UE to the MME. The MME receives the identifier of the remote UE sent by the proximity service function entity.

S602: The MME sends the identifier of the remote UE to a PCRF entity, where the identifier of the remote UE is used by the PCRF entity to obtain subscription information of the remote UE.

Specifically, the MME sends the identifier of the remote UE to a PGW, and the PGW sends the identifier of the remote UE to the PCRF. The PCRF entity obtains the subscription information of the remote UE from an SPR according to the identifier of the remote UE.

Optionally, before S602, the method further includes: performing, by the MME, authorization check on the remote UE. Specifically, the MME performs authorization check on the remote UE according to subscription information in an HSS of the remote UE and subscription information in an HSS of the relay UE. The MME may perform authorization check on the remote UE by using subscription information read from the HSS of the relay UE and the HSS of the remote UE. The authorization check includes: whether the remote UE can use the relay UE to perform data transmission with a network side, and whether the remote UE can trigger bearer establishment or modification of the relay UE.

According to the data processing method provided in this embodiment, an MME receives an identifier of remote UE sent by relay UE, or an MME receives an identifier of remote UE sent by a proximity service function entity; the MME sends the identifier of the remote UE to a PCRF entity, where the identifier of the remote UE is used by the PCRF entity to obtain subscription information of the remote UE; and the PCRF may obtain the subscription information of the remote UE according to the identifier of the remote UE, and modify or establish a bearer according to the subscription information of the remote UE, thereby ensuring service QoS when the remote UE interacts with a network side.

Figure 7:
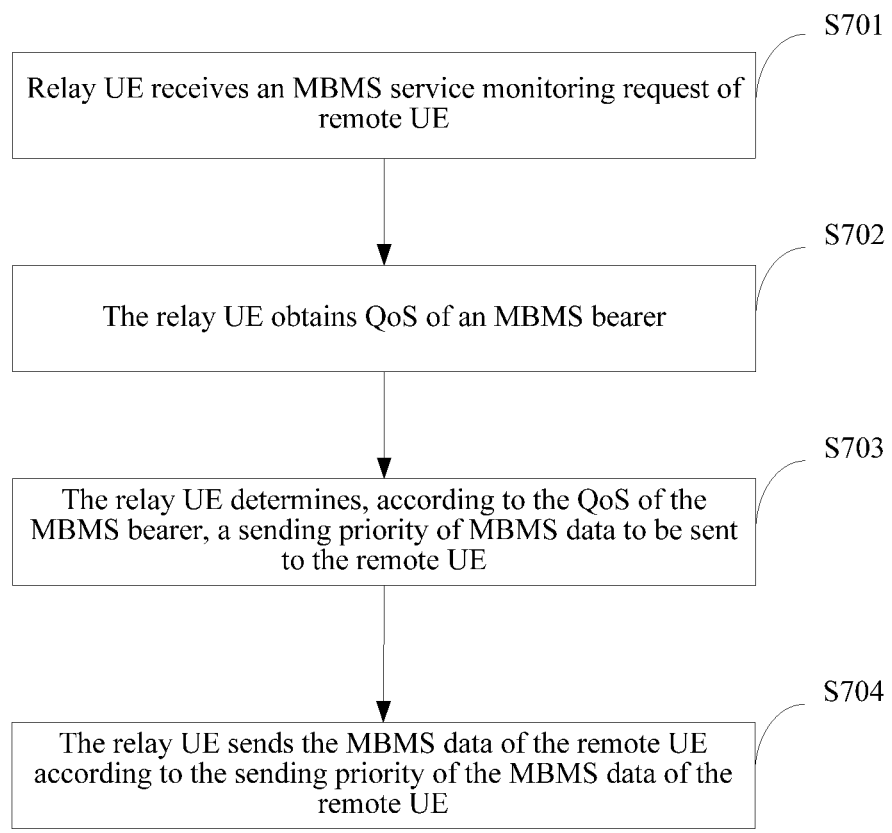
FIG. 7 is a schematic flowchart of Embodiment 5 of a data processing method according to an embodiment of the present invention.

FIG. 7 is a schematic flowchart of Embodiment 5 of a data processing method according to an embodiment of the present invention. As shown in FIG. 7, the data processing method provided in this embodiment includes the following steps.

S701: Relay UE receives an MBMS monitoring request of remote UE.

Specifically, after the relay UE establishes one-to-one communication with the remote UE, the relay UE allocates an IP address to the remote UE. The remote UE sends the multimedia broadcast multicast service (MBMS) monitoring request to the relay UE, and the relay UE receives the MBMS monitoring request of the remote UE, to receive MBMS data of the remote UE.

S702: The relay UE obtains QoS of an MBMS bearer.

Specifically, the relay UE may obtain the QoS of the MBMS bearer from the remote UE, or the relay UE obtains the QoS of the MBMS bearer from an MME, or the relay UE obtains the QoS of the MBMS bearer from an eNB.

Optionally, the obtaining, by the relay UE, the QoS of the MBMS bearer from the remote UE includes: receiving, by the relay UE, the QoS of the MBMS bearer that is carried in the MBMS monitoring request sent by the remote UE.

S703: The relay UE determines, according to the QoS of the MBMS bearer, a sending priority of MBMS data to be sent to the remote UE.

Specifically, the relay UE determines, according to the QoS of the MBMS bearer, and a correspondence between QoS of an MBMS bearer and a sending priority of MBMS data, the sending priority of the MBMS data to be sent to the remote UE. The correspondence is configured by a proximity service function entity or an MME for the relay UE.

S704: The relay UE sends the MBMS data of the remote UE according to the sending priority of the MBMS data of the remote UE.

Specifically, the relay UE sends the MBMS data to the remote UE according to the determined sending priority of the MBMS data to be sent to the remote UE.

Figure 8:
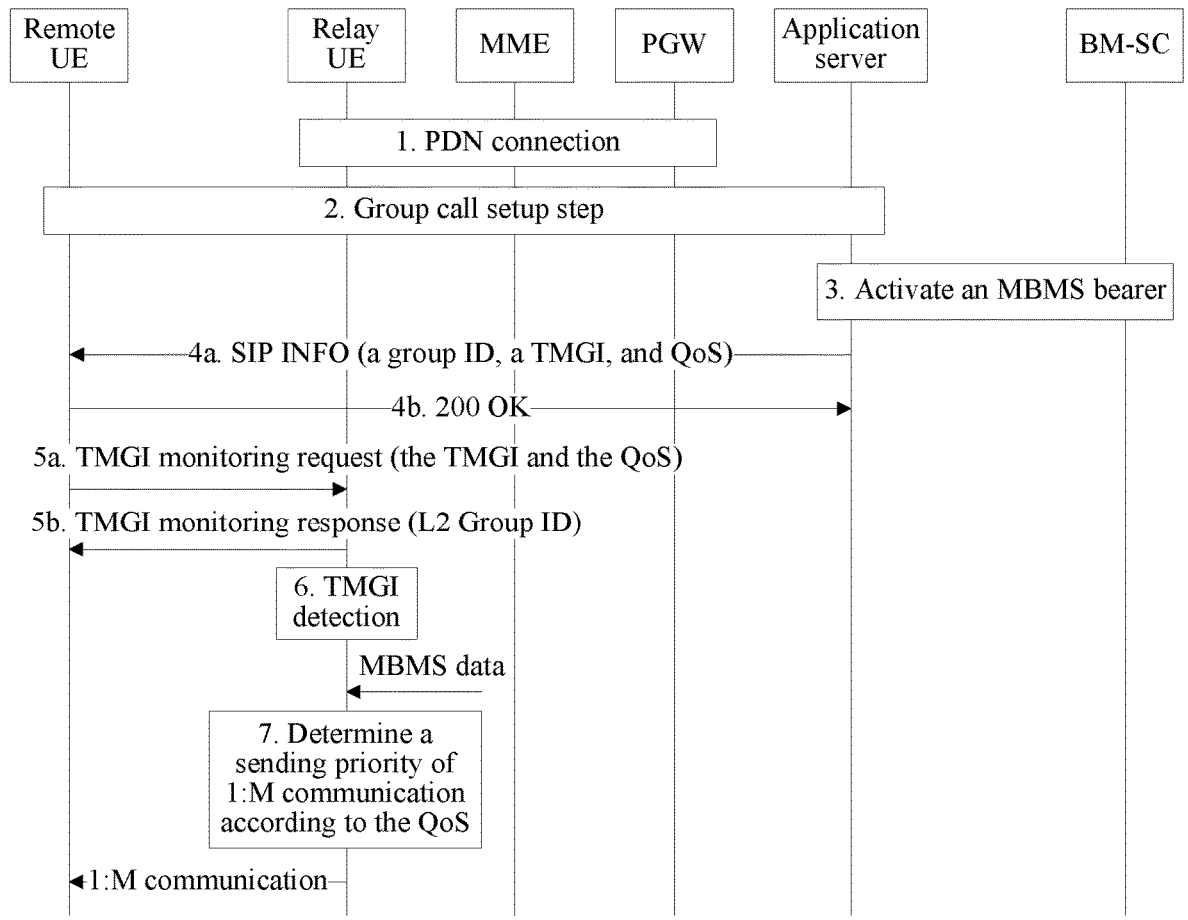
FIG. 8 is a schematic signaling flowchart of an implementation manner according to Embodiment 5 of the present invention.

FIG. 8 is a schematic signaling flowchart of an implementation manner according to Embodiment 5 of the present invention. As shown in FIG. 8, a data processing method provided in this implementation manner includes:

Step 1: Relay UE establishes a PDN connection.

Step 2: Group call setup: Remote UE initiates an MBMS monitoring request, for example, a group call, through an application server.

Step 3: The application server activates an MBMS bearer.

Step 4a: Session Initiation Protocol (SIP) information, including a group ID, a TMGI, and QoS: The application server provides a group ID and QoS of an MBMS bearer corresponding to a temporary mobile group identity (TMGI) to the remote UE by using the SIP information.

Step 4b: 200 OK: A response message.

Step 5a to 5b: A TMGI monitoring request, including the TMGI and the QoS and a TMGI monitoring response.

Step 6: TMGI detection: After detecting the TMGI, the relay UE starts to receive MBMS data.

Step 7: Determine, according to the QoS, a sending priority of 1:M communication, where the relay UE determines, according to the QoS of the MBMS bearer, a sending priority of data to be sent to the remote UE.

According to the data processing method provided in this embodiment, relay UE receives an MBMS monitoring request of remote UE, obtains QoS of an MBMS bearer, and determines, according to the QoS of the MBMS bearer, a sending priority of data to be sent to the remote UE. According to QoS of a bearer, a sending priority of MBMS data when the remote UE performs MBMS communication by using the relay UE may be determined, thereby ensuring communication quality of remote UE.

Figure 9:
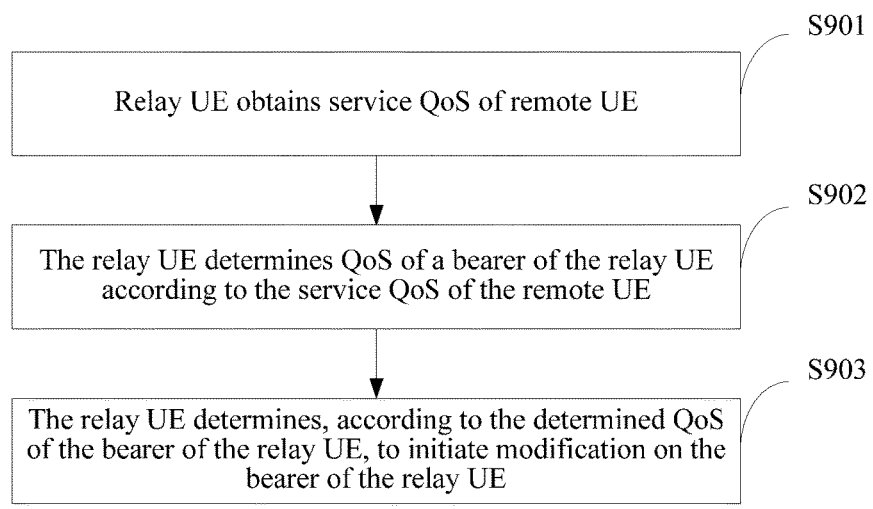
FIG. 9 is a schematic flowchart of Embodiment 6 of a data processing method according to an embodiment of the present invention.

FIG. 9 is a schematic flowchart of Embodiment 6 of a data processing method according to an embodiment of the present invention. As shown in FIG. 9, the data processing method provided in this embodiment includes the following steps.

S901: Relay UE obtains service QoS of remote UE.

Specifically, the relay UE receives a data or signaling message sent by the remote UE, where the data or signaling message includes the service QoS of the remote UE. The relay UE obtains the service QoS of the remote UE from the data or signaling message sent by the remote UE. The service QoS includes a sending priority of data of the remote UE or a differentiated services code point (DSCP) value in data. The relay UE obtains the service QoS of the remote UE according to the sending priority of the data of the remote UE or the DSCP value in the data.

S902: The relay UE determines QoS of a bearer of the relay UE according to the service QoS of the remote UE.

Specifically, the relay UE determines the QoS of the bearer of the relay UE according to a correspondence between service QoS and QoS of a bearer, and the service QoS of the remote UE. The correspondence is configured by a proximity service function entity or an MME for the UE.

S903: The relay UE determines, according to the determined QoS of the bearer of the relay UE, to initiate modification on the bearer of the relay UE.

Specifically, the relay UE sends a bearer resource modification request message to an MME, where the message includes the determined QoS, an identifier of the remote UE, and packet filter information, and the packet filter information includes an IP address and a port number of the remote UE.

Optionally, before the relay UE sends bearer modification according to the determined QoS, the method further includes: determining, by the relay UE, whether a current bearer can satisfy the determined QoS, and if the current bearer can satisfy the determined QoS adding a packet filter including information about the remote UE, for example, the IP address and the port number, to a TFT corresponding to the current bearer, to transmit the data of the remote UE, or if not, initiating, by the relay UE, modification on the bearer according to the determined QoS.

Figure 10:
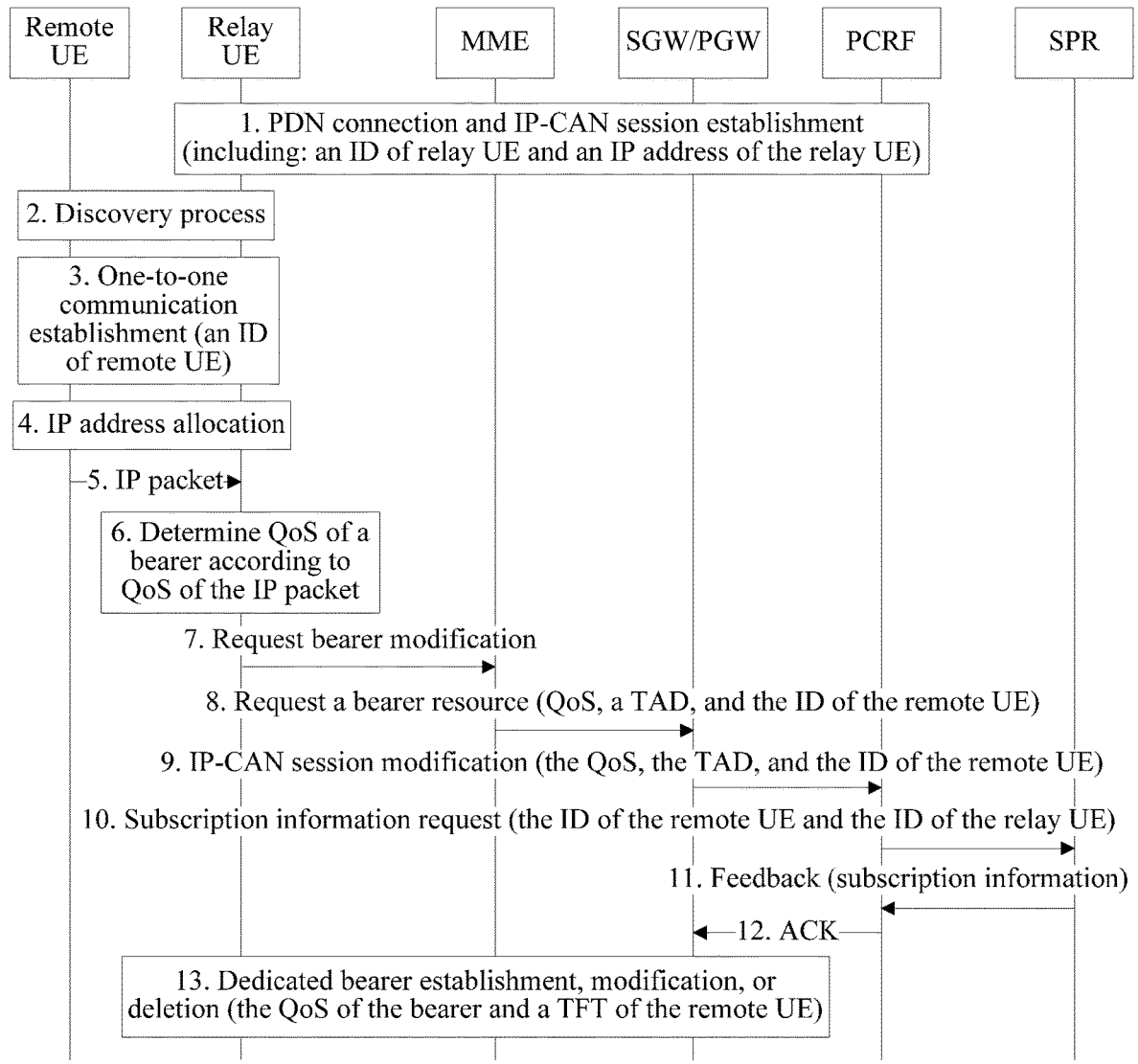
FIG. 10 is a schematic signaling flowchart of an implementation manner according to Embodiment 6 of the present invention.

FIG. 10 is a schematic signaling flowchart of an implementation manner according to Embodiment 6 of the present invention. As shown in FIG. 10, a data processing method provided in this implementation manner includes:

Step 1: Relay UE establishes a PDN connection and establishes an IP-CAN session (including: an ID of the relay UE and an IP address of the relay UE), where the relay UE sends the ID of the relay UE and the IP address of the relay UE to a network element on a network side, and specifically, the relay UE may establish a PDN connection with the network side by using a network attachment process.

Step 2: A discovery process: Remote UE discovers, by using the discovery process, relay UE that can provide a relay service to the remote UE.

Step 3: One-to-one communication establishment, including an ID of the remote UE: The remote UE establishes one-to-one communication with the relay UE, where the remote UE may include the identifier (ID) of the remote UE to a communication request.

Step 4: IP address allocation: The relay UE allocates an IP address to the remote UE.

Step 5: The remote UE transmits an IP packet to the relay UE.

Step 6: The relay UE determines QoS of a bearer according to QoS of the IP packet.

Step 7: The relay UE modifies the bearer according to the request.

Step 8: An MME requests a bearer resource including the QoS, a TAD, and the ID of the remote UE from a P-GW, where a bearer resource request message includes the determined QoS of the bearer, the Traffic Aggregate Description (TAD), and the ID of the remote UE.

Step 9: The P-GW initiates IP-CAN session modification including the QoS, the TAD, and the ID of the remote UE, where a session modification message includes the determined QoS of the bearer, the TAD, and the ID of the remote UE.

Step 10: A subscription information request including the ID of the remote UE and the ID of the relay UE: A PCRF obtains subscription information of the remote UE from an SPR according to the ID of the remote UE.

Step 11: A feedback including the subscription information: The SPR feeds back the subscription information of the remote UE to the PCRF.

Step 12: ACK: The PCRF returns a response message to the P-GW.

Step 13: Dedicated bearer establishment, modification, or deletion, including the QoS of the bearer and a TFT of the remote UE: The P-GW initiates a bearer processing process.

According to the data processing method provided in this embodiment, relay UE obtains service QoS of remote UE, the relay UE determines QoS of a bearer of the relay UE according to the service QoS of the remote UE, and the relay UE determines, according to the determined QoS of the bearer of the relay UE, to initiate modification on the bearer of the relay UE, thereby ensuring the service QoS of the remote UE.

Figure 11:
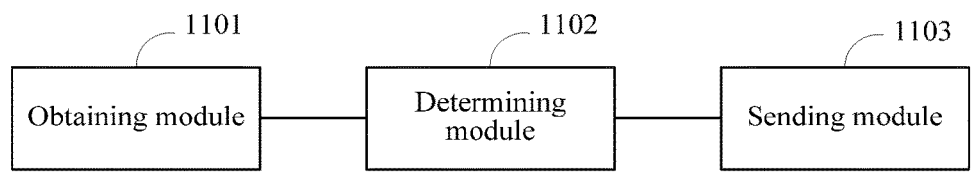
FIG. 11 is a schematic structural diagram of Embodiment 1 of a data processing device according to the present invention.

FIG. 11 is a schematic structural diagram of Embodiment 1 of a data processing device according to the present invention. As shown in FIG. 11, the data processing device provided in this embodiment includes: an obtaining module 1101, configured to obtain subscription information of remote UE; a determining module 1102, configured to determine a QoS rule of relay UE according to the subscription information and service quality of service QoS of the remote UE; and a sending module 1103, configured to send the QoS rule to a packet data network gateway PGW, where the QoS rule is used by the PGW to modify or establish a bearer of the relay UE, and the bearer of the relay UE is used by the relay UE to forward data of the remote UE.

The obtaining module 1101 is specifically configured to obtain the subscription information of the remote UE from a subscription profile repository SPR according to an identifier of the remote UE.

The data processing device provided in this embodiment further includes: a first receiving module, configured to receive the identifier of the remote UE sent by the PGW; a storage module, configured to store the subscription information of the remote UE in a context of the relay UE; and a second receiving module, configured to receive the service QoS from an application function AF entity of the remote UE; or a third receiving module, configured to receive the service QoS provided by the relay UE.

The sending module 1103 is further configured to send the identifier of the remote UE and a service data flow template to the PGW, where the service data flow template includes information about an IP address and a port number of the remote UE.

Specifically, the device provided in this embodiment may be correspondingly configured to execute the technical solutions of the method embodiments shown in FIG. 1 and FIG. 2, implementation principles and technical effects thereof are similar, and details are not described herein.

Figure 12:
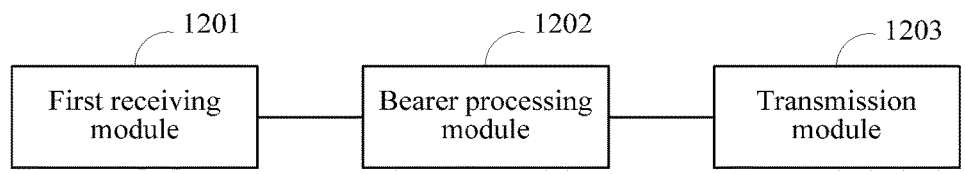
FIG. 12 is a schematic structural diagram of Embodiment 2 of a data processing device according to the present invention.

FIG. 12 is a schematic structural diagram of Embodiment 2 of a data processing device according to the present invention. As shown in FIG. 12, the data processing device provided in this embodiment includes: a first receiving module 1201, configured to receive a QoS rule of relay UE sent by a PCRF entity, where the QoS rule of the relay UE is determined by the PCRF according to subscription information and service QoS of remote UE; a bearer processing module 1202, configured to modify or establish a bearer of the relay UE according to the QoS rule of the relay UE; and a transmission module 1203, configured to send or receive data of the remote UE by using the bearer of the relay UE.

The device provided in this embodiment further includes: a second receiving module, configured to receive an identifier of the remote UE sent by an MME; and a sending module, configured to send the identifier of the remote UE to the PCRF.

Specifically, the device provided in this embodiment may be correspondingly configured to execute the technical solutions of the method embodiment shown in FIG. 5, implementation principles and technical effects thereof are similar, and details are not described herein.

Figure 13:
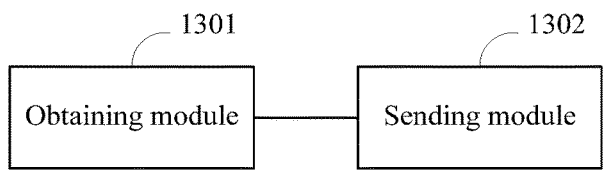
FIG. 13 is a schematic structural diagram of Embodiment 3 of a data processing device according to the present invention.

FIG. 13 is a schematic structural diagram of Embodiment 3 of a data processing device according to the present invention. As shown in FIG. 13, the data processing device provided in this embodiment includes: an obtaining module 1301, configured to obtain an identifier of remote UE; and a sending module 1302, configured to send the identifier of the remote UE to a PCRF entity, where the identifier of the remote UE is used by the PCRF entity to obtain subscription information of the remote UE.

The obtaining module 1301 is specifically configured to receive the identifier of the remote UE sent by relay UE; or configured to receive the identifier of the remote UE sent by a proximity service function entity. The device provided in this embodiment further includes: an authorization check module, configured to perform authorization check on the remote UE, and specifically configured to perform authorization check on the remote UE according to subscription information in an HSS of the remote UE and subscription information in an HSS of the relay UE.

Specifically, the device provided in this embodiment may be correspondingly configured to execute the technical solutions of the method embodiment shown in FIG. 6, implementation principles and technical effects thereof are similar, and details are not described herein.

Figure 14:
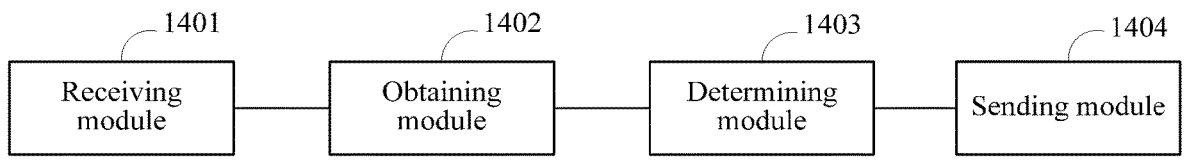
FIG. 14 is a schematic structural diagram of Embodiment 4 of a data processing device according to the present invention.

FIG. 14 is a schematic structural diagram of Embodiment 4 of a data processing device according to the present invention. As shown in FIG. 14, the data processing device provided in this embodiment includes: a receiving module 1401, configured to receive an MBMS monitoring request of remote UE; an obtaining module 1402, configured to obtain quality of service QoS of an MBMS bearer; a determining module 1403, configured to determine, according to the QoS of the MBMS bearer, a sending priority of MBMS data to be sent to the remote UE; and a sending module 1404, configured to send the MBMS data of the remote UE according to the sending priority of the MBMS data of the remote UE.

The obtaining module 1402 is specifically configured to obtain the QoS of the MBMS bearer from the remote UE; or configured to obtain the QoS of the MBMS bearer from an MME; or configured to obtain the QoS of the MBMS bearer from an evolved NodeB eNB. The MBMS monitoring request message carries the QoS of the MBMS bearer, and the obtaining module 1402 is specifically configured to obtain the QoS of the MBMS bearer from the MBMS monitoring request message. The determining module 1403 is specifically configured to determine, according to the QoS of the MBMS bearer and a correspondence between QoS and a sending priority, the sending priority of the MBMS data to be sent to the remote UE. The correspondence is configured by a proximity service function entity or an MME for the relay UE.

Specifically, the device provided in this embodiment may be correspondingly configured to execute the technical solutions of the method embodiment shown in FIG. 7, implementation principles and technical effects thereof are similar, and details are not described herein.

Figure 15:
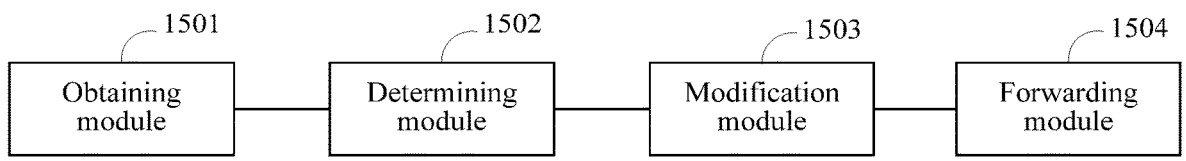
FIG. 15 is a schematic structural diagram of Embodiment 5 of a data processing device according to the present invention.

FIG. 15 is a schematic structural diagram of Embodiment 5 of a data processing device according to the present invention. As shown in FIG. 15, the data processing device provided in this embodiment includes: an obtaining module 1501, configured to obtain service QoS of remote UE; a determining module 1502, configured to determine QoS of a bearer of relay UE according to the service QoS of the remote UE; a modification module 1503, configured to determine, according to the determined QoS of the bearer of the relay UE, to initiate modification on the bearer of the relay UE; and a forwarding module 1504, configured to forward data of the remote UE by using the modified bearer.

The obtaining module 1501 includes: a receiving unit, configured to receive a data or signaling message sent by the remote UE, where the data or signaling message includes the service QoS of the remote UE; and an obtaining unit, configured to obtain the service QoS of the remote UE from the data or signaling message sent by the remote UE.

The service QoS includes a sending priority of data of the remote UE or a differentiated services code point DSCP value in data.

The determining module 1502 is specifically configured to determine the QoS of the bearer of the relay UE according to a correspondence between service QoS and QoS of a bearer, and the service QoS of the remote UE. The correspondence is configured by a proximity service function entity or an MME for the relay UE. The modification module 1503 is specifically configured to send a bearer modification request message to an MME, where the bearer modification request message includes the determined QoS, an identifier of the remote UE, and packet filter information, and the packet filter information includes an IP address and a port number of the remote UE.

Specifically, the device provided in this embodiment may be correspondingly configured to execute the technical solutions of the method embodiment shown in FIG. 9, implementation principles and technical effects thereof are similar, and details are not described herein.

The present invention further provides a data processing device, including: a processor, configured to obtain subscription information of remote user equipment UE, where the processor is further configured to determine a QoS rule of relay UE according to the subscription information and service quality of service QoS of the remote UE; and a transmitter, configured to send the QoS rule to a packet data network gateway PGW, where the QoS rule is used by the PGW to modify or establish a bearer of the relay UE, and the bearer of the relay UE is used by the relay UE to forward data of the remote UE.

The present invention further provides a data processing device, including: a transceiver, configured to receive a quality of service QoS rule of relay user equipment UE sent by a policy and charging rules function PCRF entity, where the QoS rule of the relay UE is determined by the PCRF according to subscription information and service QoS of remote UE; and a processor, configured to modify or establish a bearer of the relay UE according to the QoS rule of the relay UE, where the transceiver is further configured to send or receive data of the remote UE by using the bearer of the relay UE.

The present invention further provides a data processing device, including: a processor, configured to obtain an identifier of remote user equipment UE; and a transmitter, configured to send the identifier of the remote UE to a policy and charging rules function PCRF entity, where the identifier of the remote UE is used by the PCRF entity to obtain subscription information of the remote UE.

The present invention further provides a data processing device, including: a receiver, configured to receive a multimedia broadcast multicast service MBMS monitoring request of remote UE; and a processor, configured to obtain quality of service QoS of an MBMS bearer, where the processor is configured to determine, according to the QoS of the MBMS bearer, a sending priority of MBMS data to be sent to the remote UE; and a transmitter, configured to send the MBMS data of the remote UE according to the sending priority of the MBMS data of the remote UE.

The present invention further provides a data processing device, including: a processor, configured to obtain service quality of service QoS of remote UE, where the processor is further configure to determine QoS of a bearer of relay UE according to the service QoS of the remote UE; and the processor is further configure to determine, according to the determined QoS of the bearer of the relay UE, to initiate modification on the bearer of the relay UE; and a transmitter, configured to forward data of the remote UE by using the modified bearer.

In the several embodiments provided in this application, it should be understood that the disclosed apparatus and method may be implemented in other manners. For example, the described device embodiments are merely exemplary. For example, the unit or module division is merely logical function division and may be other division in actual implementation. For example, multiple units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on multiple network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method of data processing, comprising:
    establishing, by a relay user equipment (UE), a packet data network (PDN) connection;
    receiving, by the relay UE, a multimedia broadcast multicast service (MBMS) monitoring request of a remote UE;
    obtaining, by the relay UE, quality of service (QoS) of an MBMS bearer from the remote UE;
    determining, by the relay UE according to the QoS of the MBMS bearer, a sending priority of MBMS data to be sent to the remote UE, comprising:
    determining, by the relay UE and according to the QoS of the MBMS bearer and a correspondence between the QoS and a first sending priority associated with the MBMS data, a second sending priority associated with sending the MBMS data to the remote UE; and
    sending, by the relay UE, the MBMS data to the remote UE according to the second sending priority.

2. The method according to claim 1, wherein the MBMS monitoring request is a temporary mobile group identity (TMGI) monitoring request including a TMGI of the MBMS bearer and QoS of the MBMS bearer.

3. The method according to claim 2, wherein the MBMS data is received by the relay UE after detecting the TMGI.

4. The method according to claim 2, the method further comprises:
    sending, by the relay UE, a TMGI monitoring response to the remote UE, wherein the TMGI monitoring response includes an L2 group ID.

5. An apparatus, comprising:
    a processor; and
    a non-transitory computer-readable storage medium coupled to the processor and storing programming instructions to be executed by the processor to configure the processor to:
    establish a packet data network (PDN) connection;
    receive a multimedia broadcast multicast service (MBMS) monitoring request of remote UE;
    obtain quality of service (QoS) of an MBMS bearer from the remote UE;
    determine according to the QoS of the MBMS bearer, a sending priority of MBMS data to be sent to the remote UE, comprising:
    determine, by the relay UE and according to the QoS of the MBMS bearer and a correspondence between the QoS and a first sending priority associated with the MBMS data, a second sending priority associated with sending the MBMS data to the remote UE; and
    send the MBMS data to the remote UE according to the second sending priority.

6. The apparatus according to claim 5, wherein the MBMS monitoring request is a temporary mobile group identity (TMGI) monitoring request including a TMGI of the MBMS bearer and QoS of the MBMS bearer.

7. The apparatus according to claim 6, wherein the MBMS monitoring request is a temporary mobile group identity (TMGI) monitoring request including a TMGI of the MBMS bearer and QoS of the MBMS bearer.

8. The apparatus according to claim 6, the programming instructions further configure the processor to:
    send a TMGI monitoring response to the remote UE, wherein the TMGI monitoring response includes an L2 group ID.

9. A data processing method, comprising:
    receiving, by a remote user equipment (UE) from an application server, Session Initiation Protocol (SIP) information including a temporary mobile group identity (TMGI), and Quality of Service (QOS) of a multimedia broadcast multicast service (MBMS) bearer corresponding to the TMGI;
    sending, by the remote UE, a temporary mobile group identity (TMGI) monitoring request to relay UE, wherein the TMGI monitoring request includes the TMGI and the quality of service (QoS) of the MBMS bearer;
    receiving, by the remote UE, a TMGI monitoring response from the relay UE; and
    receiving, by the remote UE, MBMS data from the relay UE, wherein a first sending priority associated with sending the MBMS data to the remote UE is determined according to the QoS of the MBMS bearer and a second priority associated with the MBMS data.

10. The method according to claim 9, wherein the MBMS data is received by the relay UE after detecting the TMGI.

11. The method according to claim 9, wherein the TMGI monitoring response includes an L2 group ID.

12. An apparatus, comprising:
a processor; and
a non-transitory computer-readable storage medium coupled to the processor and storing programming instructions to be executed by the processor to configure the processor to:
receive from an application server Session Initiation Protocol (SIP) information including a temporary mobile group identity (TMGI), and Quality of Service (QOS) of a multimedia broadcast multicast service (MBMS) bearer corresponding to the TMGI;
send a temporary mobile group identity (TMGI) monitoring request to relay user equipment (UE), wherein the TMGI monitoring request includes the TMGI and the quality of service (QoS) of the MBMS bearer;
receive a TMGI monitoring response from the relay UE; and
receive MBMS data from the relay UE, wherein a first sending priority associated with sending the MBMS data from the relay UE to the apparatus is determined according to the QoS of the MBMS bearer and a second priority associated with the MBMS data.

13. The apparatus according to claim 12, wherein the MBMS data is received by the relay UE after detecting the TMGI.

14. The apparatus according to claim 12, wherein the TMGI monitoring response includes an L2 group ID.

* * * * *